July 26, 1927.

L. W. LESSLER 1,637,225

CAMERA FRONT CATCH

Filed Feb. 24, 1926

INVENTOR
LEW W. LESSLER.
BY *Philip S. Hopkins*
ATTORNEY

Patented July 26, 1927.

1,637,225

UNITED STATES PATENT OFFICE.

LEW W. LESSLER, OF JOHNSON CITY, NEW YORK, ASSIGNOR TO ANSCO PHOTOPRODUCTS, INC., OF BINGHAMTON, NEW YORK.

CAMERA-FRONT CATCH.

Application filed February 24, 1926. Serial No. 90,332.

My invention pertains to cameras, particularly to the folding type provided with a slidable element employed in the focusing operation of the camera.

The primary object of my invention is to provide a catch device which is automatic in its operation, to prevent the sliding front of the camera from being returned to the body of the camera until after the focusing element has been brought to the predetermined or closed, position.

Another object is to provide means for supporting the catch in its operating position whereby accidental displacement thereof is prevented.

A still further object is to provide such a device which is inexpensive, easily assembled, and which is small, inconspicuous and does not interfere in any way with the proper operation of the camera.

Other objects and advantages will be apparent as the description proceeds, reference being had to the accompanying drawing wherein like reference numerals indicate like parts.

Figure 1:
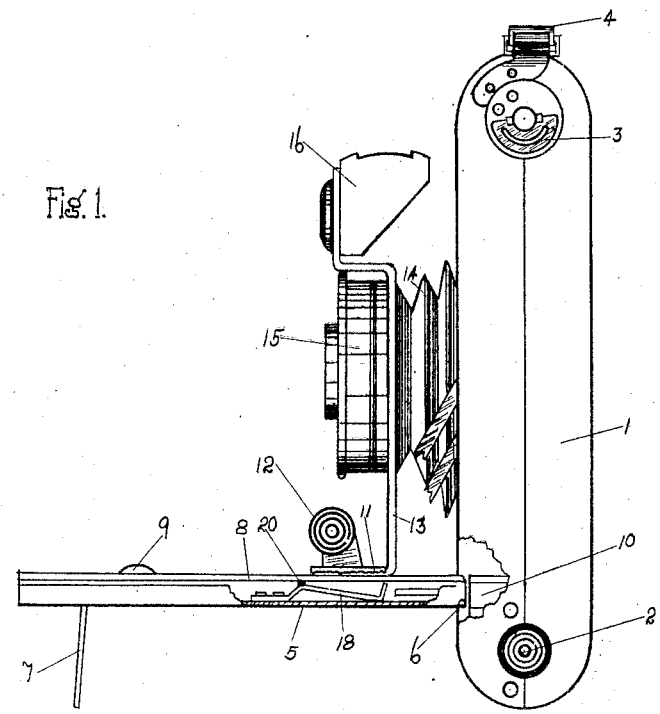
Figure 1 is a side view of a conventional folding camera with the platform open and the sliding front partially pulled out thereon.

Reference numeral 1 indicates the body of the camera provided with the usual spool pin 2, winding key 3, and handle 4. The platform 5 is pivoted in the usual manner as at 6 to the body of the camera and is adapted to be folded down to the position shown in Figures 1 and 2. A supporting foot 7 may be provided to support the platform in this position.

Figure 2:
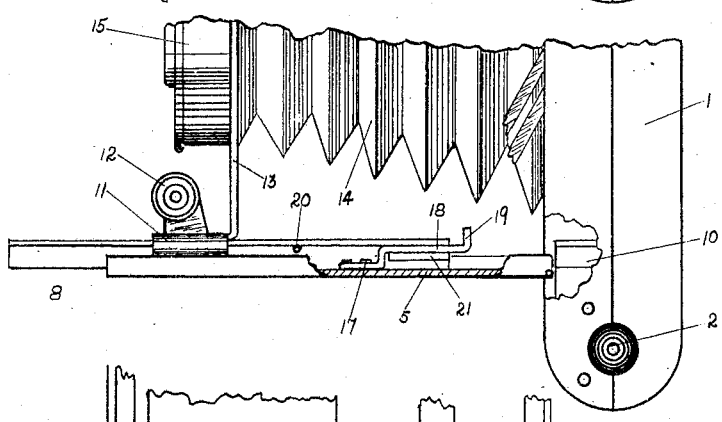
Figure 2 is a detail side view similar to Figure 1 with certain parts broken away for clearness of illustration, showing the sliding front pulled out to its operative position on the platform and the focusing element extended.
Figure 3:
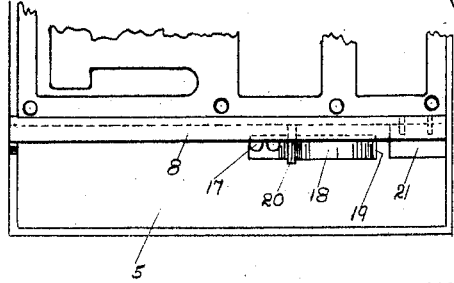
Figure 3 is a top plan view of one side of the platform showing the cooperation between my improved catch and the focusing rail.

Slidably mounted in any desired or suitable manner upon the platform 5 is a track or rail member 8 substantially the length of the platform, and movable outwardly as shown in Figure 2 by any conventional focusing device 9. A fixed track or rail member 10 is provided within the body of the camera in alignment with the track 8.

Mounted to slide upon the tracks or rails 8 and 10 is a camera front 11 embracing the rails on either side as shown clearly in Figure 2, and provided with the finger holds or gripping means 12 whereby the operator may grasp the front and slide it backward or forward on the rails. The front member 11 also carries an upstanding support 13 to which is attached the front end of the usual extension bellows 14 and shutter 15. The top of the support 13 carries the usual view finder 16. The sliding front member 11 is preferably frictionally held in its set or adjusted position on the rail 8, although it will be understood that any desired form of spring or other locking means may be provided for this purpose.

Mounted on the platform 5 adjacent one side of the rail member 8, as at 17, is a longitudinally extending spring finger 18 provided at its free end with an upturned portion 19. The normal tendency of the resilient catch member 18 is to assume the position shown in Figure 2 with the upturned portion 19 in the path of the operating camera front 11. A lateral pin 20 is carried by one side of the rail 8 and is mounted in a position to engage the catch member 18 and force the same downwardly to the position shown in Figure 1 when the rail member 8 is moved inwardly upon the platform. A laterally extending supporting shelf 21 is also carried by the rail member 8 at the rear end thereof and lies in a plane just below that of the catch member 18.

The purpose of the various elements just described will be apparent from the following description of the operation of my invention.

When the operator desires to make an exposure with the camera 1, it will be understood that the sliding front 11 with its attendant parts is normally positioned within the body of the camera upon the stationary rail sections 10. Upon lowering the platform 5, the operator grasps the finger holds 12 and pulls the camera front 11 out of the body of the camera onto the aligned rail member 8 to a given position on such rail member. The camera is now focused in the usual manner by sliding the rail member 8 carrying the sliding front 11 outwardly to the desired position.

It will be observed that when the sliding rail member 8 is moved outwardly, as to the position shown in Figure 2, for the purpose of focusing, the rail members 8 and 10 become separated. Ordinarily in such position, if the sliding front were moved back to the body of the camera without first returning the rail member 8 to the position shown in Figure 1, the sliding front 11 would slip off of the rail member 8 and become displaced with relation to the fixed rail member 10 within the camera. To prevent such occurrence, my improved catch has been provided. It will be noted from Figure 1 that with the rail member 8 in its normal position, the pin 20 engages the spring catch 18 and holds the same downwardly so that the sliding front 11 may be pulled out without interference. However, after the sliding front 11 has been pulled into position on the rail 8 and said rail is moved forwardly for focusing, the pin 20 leaves the catch 18 which is then free to assume the position shown in Figure 2 with the upturned end 19 in the path of the sliding member 11. During such operation, it will be noted that as soon as the catch 18 has assumed its upper position shown in Figure 2, the supporting shelf 21 carried by the rail 8 slides along directly beneath the catch 18 thus rigidly holding it in its upper position and preventing the accidental displacement thereof. It will be clear therefore that with the parts in the position shown in Figure 2, the operator cannot move the sliding front 11 back off of the rail 8 because of the detaining upturned end 19 of the catch 18. As soon however, as the rail 8 is returned to the position shown in Figure 1, which by the way is obviously the only position in which the platform can be closed, the pin 20 again engages the catch 18, the supporting shelf 21 having in the meantime passed out from under the catch, whereupon the catch is again depressed and the sliding front 11 moved from the rail 8 onto the closely abutting end of the aligned rail member 10.

It will thus be seen that I have provided a very efficient and practical, yet simple and inexpensive catch means for preventing the accidental displacement of the sliding front from its rail member. Of course, many changes may be made in details of construction and operation without departing from the scope of my invention. I do not limit myself therefore to the exact form shown other than by the appended claims.

I claim:—

1. In combination with the platform of a camera, a slidable rail thereon, a sliding front on said rail, a spring catch on said platform engageable with said front when said rail is extended, and means on said rail for disengaging said catch from said front when said rail is returned.

2. In combination with the platform of a camera, a slidable rail thereon, a sliding front on said rail, a spring catch on said platform normally in the path of said front when said rail is extended, and a pin on said rail for depressing said catch when said rail is returned.

3. In combination with the platform of a camera, a slidable rail thereon, a sliding front on said rail, a spring catch attached to said platform adjacent said rail and having its free end normally in the path of said front when said rail is extended, said free end being upturned, and a pin projecting laterally from said rail for engaging and depressing said catch when said rail is returned.

4. In combination with the platform of a camera, a slidable rail thereon, a sliding front on said rail, a spring catch on said platform normally in the path of said front when said rail is extended, a supporting shelf on said rail for engaging beneath said catch in such position, and means on said rail for depressing said catch when said rail is returned and said shelf displaced.

LEW W. LESSLER.